US009931635B1

(12) United States Patent
Ho

(10) Patent No.: US 9,931,635 B1
(45) Date of Patent: Apr. 3, 2018

(54) COVER FOR MICROPLATE OF MULTIWELL ASSEMBLY AND METHOD OF PROCESSING FLUID SAMPLE

(71) Applicant: Pall Corporation, Port Washington, NY (US)

(72) Inventor: Huddee Ho, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 63 days.

(21) Appl. No.: 15/266,986

(22) Filed: Sep. 15, 2016

(51) Int. Cl.
*G01N 21/03* (2006.01)
*B01L 3/00* (2006.01)
*B01L 9/00* (2006.01)

(52) U.S. Cl.
CPC ........... *B01L 3/50853* (2013.01); *B01L 9/523* (2013.01); *B01L 2200/142* (2013.01); *B01L 2300/041* (2013.01); *B01L 2300/046* (2013.01); *B01L 2300/0609* (2013.01); *B01L 2300/0829* (2013.01); *B01L 2300/123* (2013.01)

(58) Field of Classification Search
CPC .................................. B01L 3/00; G01N 21/03
USPC .......................... 422/551-553; 436/165, 174
See application file for complete search history.

(56) References Cited

U.S. PATENT DOCUMENTS 4,919,894 A * 4/1990 Daniel ...................... B01L 9/06 422/561
5,484,731 A * 1/1996 Stevens ................. B01L 3/5085 206/558
5,514,343 A * 5/1996 Verwohlt .............. B01L 3/5085 211/74
5,789,251 A * 8/1998 Astle ................... B01L 3/50825 422/534
6,057,163 A * 5/2000 McMillan .......... G01N 21/6452 422/82.08
6,106,783 A * 8/2000 Gamble .............. B01L 3/50825 422/553
6,136,273 A * 10/2000 Seguin ................ B01L 3/50853 206/443
6,626,051 B2 * 9/2003 Zwick ................. B01L 3/50853 422/509
6,921,513 B2 7/2005 Schubert et al.
7,498,174 B2 * 3/2009 Tansey .................. B01L 3/5025 422/510
8,137,643 B2 3/2012 Matsumura et al.
9,140,367 B2 * 9/2015 Birkner ................... B01L 3/502
2007/0009396 A1 1/2007 Ho
2014/0356255 A1 12/2014 Panetz

FOREIGN PATENT DOCUMENTS

WO WO 2007/028227 A1 3/2007

* cited by examiner

*Primary Examiner* — Arlen Soderquist
(74) *Attorney, Agent, or Firm* — Leydig, Voit & Mayer, Ltd.

(57) ABSTRACT

A multiwell assembly includes a microplate and a cover. The microplate includes a set of wells. Each well defines an opening. The cover includes a body and a shutter. The body of the cover is disposed over the microplate. The shutter is mounted to the body such that the shutter is movable over a range of travel between a first position, in which the shutter occludes the openings of the set of wells, and a second position, in which the shutter is in offset relationship to the openings of the set of wells to permit access to the set of wells through the respective openings.

20 Claims, 15 Drawing Sheets

COVER FOR MICROPLATE OF MULTIWELL ASSEMBLY AND METHOD OF PROCESSING FLUID SAMPLE

BACKGROUND

This patent disclosure relates generally to a cover for a multiwell assembly and, more particularly, to a cover for a microplate of a multiwell assembly suitable for processing a fluid sample. Microplates typically have a plurality of wells for storing samples, such as, e.g., cells, reagents, analytes, mixtures, reaction products, etc. However, there is a need for improved multiwall assemblies for processing fluid samples.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure, in one aspect, is directed to embodiments of a multiwell assembly used for processing fluid samples. In addition, the present disclosure, in another aspect, is directed to embodiments of a cover for a microplate used for processing fluid samples. In still another aspect, the present disclosure is directed to embodiments of a method of processing a fluid sample in a microplate.

In one embodiment, a multiwell assembly includes a microplate and a cover. The microplate includes a set of wells. Each well defines an opening. The cover includes a body and a shutter. The body of the cover is disposed over the microplate. The shutter is mounted to the body such that the shutter is movable over a range of travel between a first position, in which the shutter occludes the openings of the set of wells, and a second position, in which the shutter is in offset relationship to the openings of the set of wells to permit access to the set of wells through the respective openings.

In another embodiment, a cover for a microplate having a set of wells with each well defining an opening is described. The cover includes a body and a shutter.

The body is configured to be disposed over the microplate. The shutter is mounted to the body such that the shutter is movable over a range of travel between a first position and a second position. The shutter is adapted to occlude the openings of the set of wells when in the first position. The shutter is adapted to be in offset relationship to the openings of the set of wells to permit access to the wells through the respective openings when in the second position.

In yet another embodiment, a method of processing a fluid sample in a microplate having a set of wells with each well defining an opening is described. The method includes depositing the fluid sample in at least one of the wells. A cover is placed over the microplate. The cover includes a shutter which is movable over a range of travel between a first position, in which the shutter occludes the openings of the set of wells, and a second position, in which the shutter is in offset relationship to the openings of the set of wells to permit access to the set of wells through the respective openings, the shutter being biased to the first position. A period of time is allowed to elapse. The shutter is moved from the first position to the second position to permit access to the wells through the respective openings. A sensor is used to sense a property of the fluid sample in one of the wells while the shutter is in the second position.

Further and alternative aspects and features of the disclosed principles will be appreciated from the following detailed description and the accompanying drawings. As will be appreciated, the covers for a microplate, multiwell assemblies, and methods of processing a fluid sample disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

[NOTE: we will modify the Figures to remove "ForteBio" and miscellaneous dimensions.]

Figure 1:
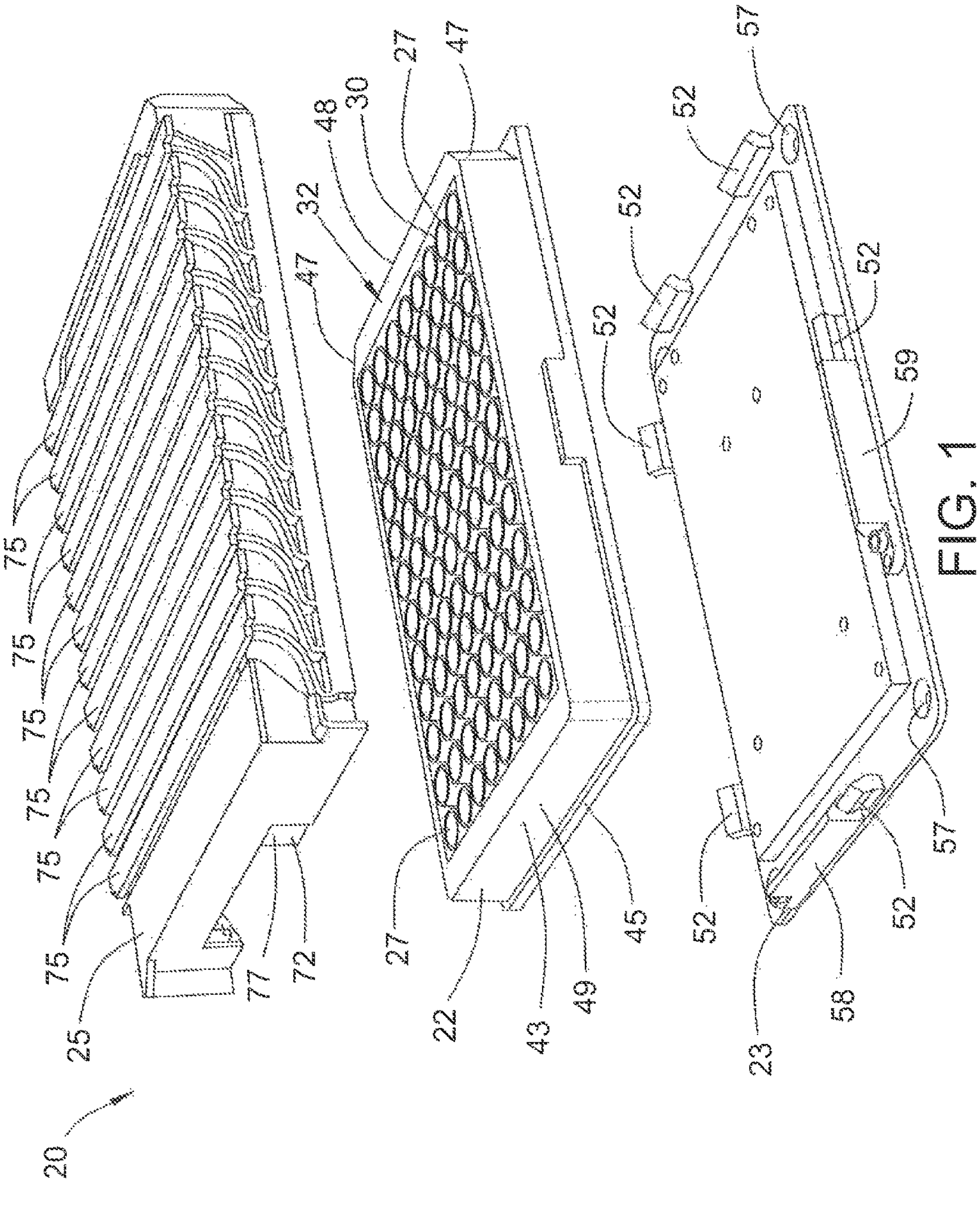
FIG. 1 is an exploded view of an embodiment of a multiwell assembly constructed in accordance with principles of the present disclosure.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

Embodiments of a cover constructed in accordance with principles of the present disclosure are adapted to be used with a microplate of a multiwell assembly for processing one or more fluid samples. In various fluid sample processing protocols, a period of time is allowed to elapse after a fluid sample is prepared before taking a measurement in order to allow a biological effect to occur. Embodiments of a cover constructed in accordance with principles of the present disclosure can be used to help prevent fluid samples in the wells of the microplate from evaporating. Accordingly, with the use of a cover constructed according to principles of the present disclosure, experiments of longer duration can be run relative to the length of time that would otherwise be possible without the use of the cover.

For example, in contrast with some multiwell assemblies, wherein it has been found that during processing, the liquid contained within these samples can evaporate at room temperature, often leading to substantial sample loss (e.g., about 20% of the sample) due to drying in the microplates within about 2 hours of processing, multiwell assemblies according to embodiments of the present disclosure can be especially suitable for use in assays that require longer processing times.

Embodiments of a cover for a microplate constructed in accordance with principles of the present disclosure can include a body and a plurality of shutters mounted thereto. The body can be configured to be disposed over the microplate such that at least a portion of the body is in overlying relationship with a plurality of wells defined by the microplate. The shutters can be mounted to the body such that they are independently movable over a range of travel between a covered position and an uncovered position. In embodiments, each shutter can each occlude the openings of a row of wells of the microplate when in the covered position, and can be in offset relationship to the openings of the associated row of wells to permit access to the wells through the respective openings when in the uncovered position. In embodiments, the shutters are biased to the covered position. In embodiments, each shutter can be opened (i.e., moved to the uncovered position) when a plurality of sensors enter the corresponding openings of the row of wells with which the shutter is associated, and closed (i.e., moved to the covered position) by the configuration of a pair of resiliently flexible shutter arms of the shutter that, in embodiments, can urge the shutter toward the covered position.

Embodiments of a cover constructed according to principles of the present disclosure can be easy to use. In embodiments, the shutters of the cover can be individually and separately pivotally moved. In embodiments, the shutters can be pivotally moved with relative ease such that a biochemical coating applied to the sensors used in the testing protocol is left substantially intact and such that the application of force to the sensors is avoided or reduced to maintain the accuracy of the measurement data obtained from the sensors.

Figure 2:
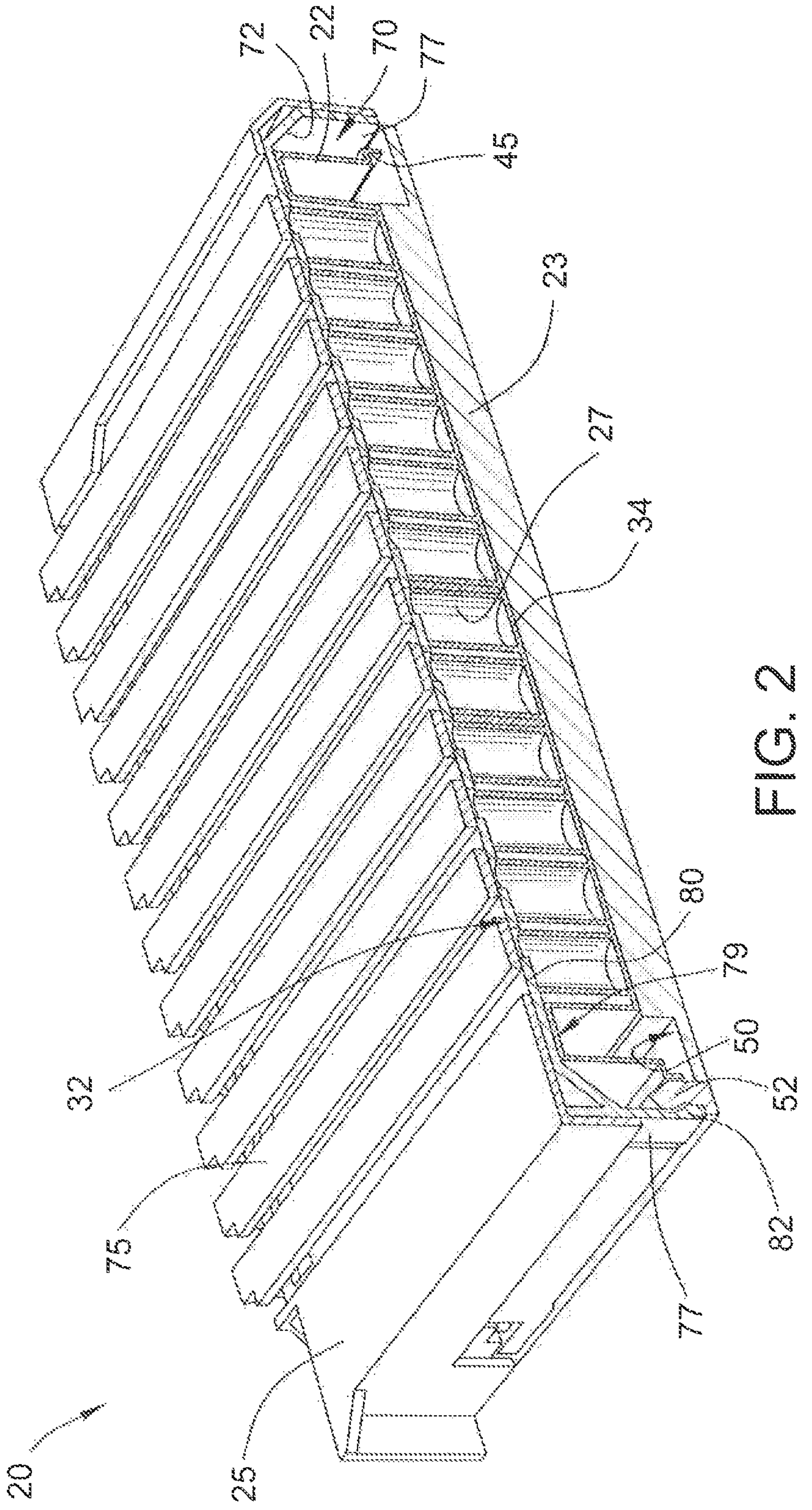
FIG. 2 is a perspective view, in longitudinal section, of the multiwell assembly of FIG. 1.

Turning now to the Figures, an embodiment of a multiwell assembly 20 constructed according to principles of the present disclosure is shown in FIGS. 1 and 2. The multiwell assembly 20 is adapted for use in processing fluid samples. The illustrated multiwell assembly 20 includes a microplate 22 (also commonly referred to as a "microtiter plate"), a microplate holder 23, and an embodiment of a cover 25 constructed according to principles of the present disclosure. The microplate 22 can be held in place by the microplate holder 23. The cover 25 can be provided to help reduce the evaporation rate of a liquid sample contained in the wells 27 of the microplate 22 (relative to the evaporation rate of the liquid sample if the cover 25 were not present over the microplate 22 in a covered position, which is shown in FIG. 2). In embodiments, the cover 25 is configured to permit an external mechanism to selectively operate the cover 25 to permit the entry of at least one sensor into operational proximity with a fluid sample contained within one of the wells 27 of the microplate 22.

Referring to FIG. 1, in embodiments, the microplate 22 can have a variety of shapes, such as, e.g., a generally rectangular shape, as illustratively shown in FIGS. 1 and 2. In embodiments, the microplate 22 can include any number of wells 27 arranged in a variety of different arrays. For example, in the illustrated embodiment, the microplate 22 comprises an industry standard microtiter plate in which the set of wells are arranged in an eight by twelve array such that the microplate 22 includes twelve rows of wells. Each well 27 defines an opening 30 (see also, FIG. 3). In embodiments, the microplate 22 can be made from any suitable material (e.g., plastic).

Referring to FIG. 1, the openings 30 of the wells 27 of the microplate 22 are substantially aligned with each other at a top surface 32 of the microplate 22, which helps define the openings 30. The wells 27 are substantially identical to each other. Accordingly, it should be understood that the description of one well 27 is applicable to all of the other wells 27.

Figure 3:
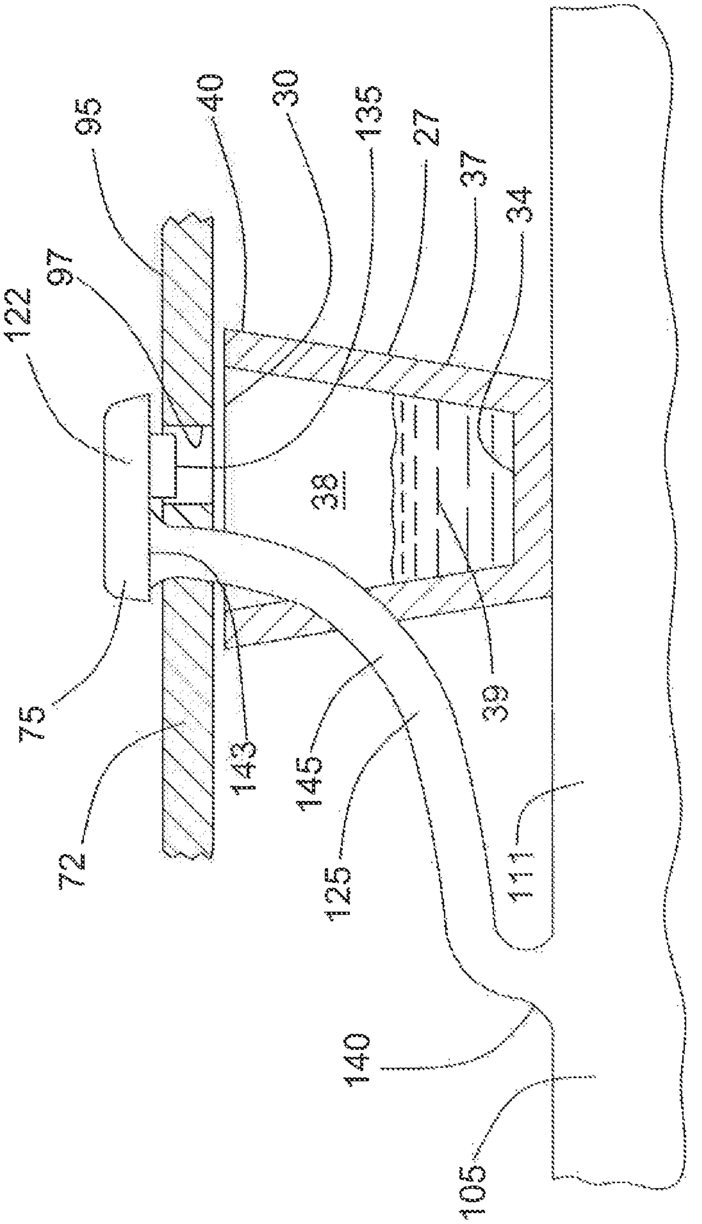
FIG. 3 is an enlarged, fragmentary diagrammatic view of a cover, partially in section, and a well, in section, of the multiwell assembly of FIG. 1, illustrating a shutter of the cover in a covered position with respect to an opening of the well.

As such, referring to FIG. 3, each well 27 has a cup-like configuration with a bottom 34 in the form of a circular disc and a sidewall 37 that cooperate together to define a receptacle 38 for holding a fluid sample 39. The wells 27 can be configured to contain a fixed volume of fluid sample 41 therein. The sidewall 37 depends from the top surface 32 such that an upper end 40 of the sidewall 37 helps define the opening 27 to the well 27. In the illustrated embodiment, the sidewall 37 is tapered such that the bottom 34 has a diameter that is smaller than the diameter of the opening 27. In other embodiments, the sidewall 27 can be substantially cylindrical or have a different shape.

Referring to FIG. 1, in the illustrated embodiment, the microplate 22 includes a sidewall 43 circumscribing the wells 27 and a flange 45 extending outwardly from the sidewall 43. The sidewall 43 can have an asymmetrical configuration to provide the microplate with a polarity to facilitate the positioning of the microplate 22 with respect to the microplate holder 23 and/or the cover 25 in a particular orientation. In the illustrated embodiment, the sidewall 43 includes a pair of chamfered corners 47 at one end 48 thereof, but not at the other end 49 so as to provide the asymmetrical configuration. In embodiments, the flange 45 can be configured to facilitate seating the microplate 22 upon, or removably connecting the microplate 22 to, one or more other components within the assembly, e.g., the plate holder 23. The illustrated flange 45 circumscribes the sidewall 43 of the microplate 22.

The microplate holder 23 is adapted to support the microplate 22. In embodiments, the microplate holder 23 comprises a support surface 50 for supporting the microplate 22 and one or more connection members 52 for engaging the cover 25. In embodiments, the microplate holder 23 can be configured to facilitate the relative alignment between the microplate 22 and the microplate holder 23 using one or more of a variety of techniques known to one skilled in the art. In embodiments, the microplate holder 23 can be made from any suitable material (e.g., metal).

In embodiments, the microplate holder 23 comprises a plate 54, which includes the support surface 50 and has a shape and size that generally correspond to the microplate 22 such that the microplate 22 can be disposed upon the support surface 50 and disposed within the perimeter of the plate 54 of the microplate holder 23. The illustrated support surface 50 has a stepped configuration such that the support surface 50 can be placed in contacting relationship with the flange 45 and the bottoms 34 of the wells 27 of the microplate 22 (see FIG. 2). In other embodiments, the support surface 50 can have a different configuration.

Referring to FIGS. 1 and 2, in embodiments, the microplate holder 23 includes at least one connection member 52 configured to retentively engage the cover 25 to retain the cover 25 in overlying relationship with the microplate 22 which itself is disposed upon the microplate holder 23. In embodiments, connection members 52 can be generally located at one or more positions along the outer periphery of the plate 54. In the illustrated embodiment, the microplate holder 23 includes on both sides and both ends of the plate 50 at least one connection member 52 in the form of a hook configured to retentively engage the cover 25.

Referring to FIG. 1, the plate 50 can define a plurality of mounting holes 57 that are configured to receive a suitable fastener therethrough for mounting the microplate holder 23 to a suitable work surface. The microplate holder 23 can include additional members 58, 59 projecting from the plate 54 that are configured to facilitate the association of the microplate 22 with the microplate holder 23.

Referring to FIGS. 1 and 2, the cover 25 can be used to control evaporation of the fluid samples contained in the wells 27 of the microplate 22. In embodiments, the cover 25 is adapted to be disposed over the microplate 22. In embodiments, the cover 25 is adapted to be disposed over the microplate 22 such that the microplate 22 is disposed within a cavity 70 defined by the interior of the cover 25 (see also, FIG. 8).

Referring to FIGS. 1 and 2, in embodiments, the cover 25 includes a body 72 and a plurality of shutters 75. Each shutter 75 is movably mounted with respect to the body 72 such that each shutter 75 is movable over a range of travel between a covered position (see FIG. 3) and an uncovered position (see FIG. 4). In the illustrated embodiment, each shutter 75 is adapted to occlude the openings 30 of the wells 27 of a given row of the microplate 22 when the shutter 75 is in the covered position. Each shutter 75 is adapted to be in offset relationship to the openings 30 of the wells 27 in the row with which it is associated to permit access to those wells 27 through the respective openings 30 when the shutter 75 is in the uncovered position. In embodiments, the shutters 75 are biased to the covered position.

In the illustrated embodiment, the microplate 22 includes twelve rows of wells 27 with eight wells 27 in each row. As such, the cover 25 includes twelve shutters 75 that are each independently movable between the covered position and the uncovered position. In other embodiments, the cover 25 can include a different number of shutters 75 to correspond to the microplate 22 with which it is intended to be used.

Referring to FIGS. 1 and 2, in the illustrated embodiment, the cover 25 has a shape that generally conforms to the shape of the microplate 22 and includes a shroud portion 77 that circumscribes the microplate 22 and helps define the cavity 70 in which the microplate 22 is disposed when the cover 25 is mounted to the microplate holder 23. Referring to FIG. 2, when the evaporation cover 25 is in its covering position, an interior surface 79 of a well cover portion 80 of the cover 25 is in contacting relationship with the top surface 32 of the microplate 22. In embodiments, the cover 25 is configured such that the shroud portion 77 of the cover 25 is in non-contacting relationship with the microplate 22 disposed within the cavity 70 of the cover 25 when the cover 25 is mounted to the microplate holder 23.

Figure 8:
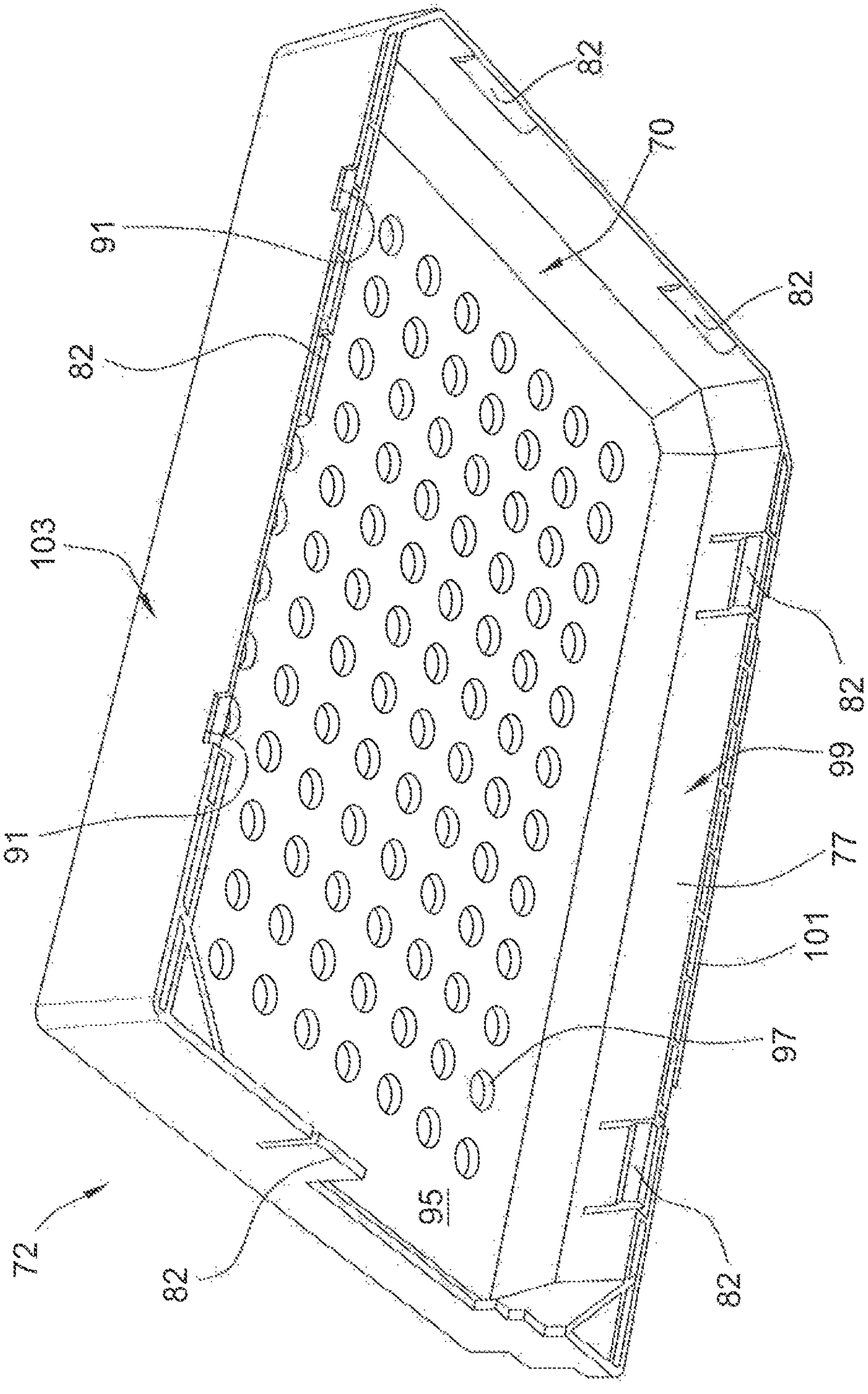
FIG. 8 is a bottom perspective view of the body of FIG. 7.

In embodiments, the cover 25 includes a number of connection members 83 corresponding to the connection members 52 of the microplate holder 23 to retentively mount the cover 25 to the microplate holder 23 (see also, FIG. 8). In the illustrated embodiment, the connection members 82 comprise a projecting tab with a complementary hook shape. The connection members 82, 52 of the cover 25 and the microplate holder 23 are configured to flex away from each other to allow the cover 25 to be moved along a normal axis relative to the holder 23 in an insertion direction. Once the hook portions of the associated connection members 82, 52 move past each other, the connection members 82, 52 return to their original positions to provide an interference fit therebetween, thereby mounting the cover 25 to the holder (see FIG. 2).

In embodiments, the cover 25 can be made from any suitable material, such as a suitable plastic, for example. In embodiments, the cover 25 can be made using any suitable technique such as using additive manufacturing (also referred to as "3D printing") or injection molding, for example.

Figure 5:
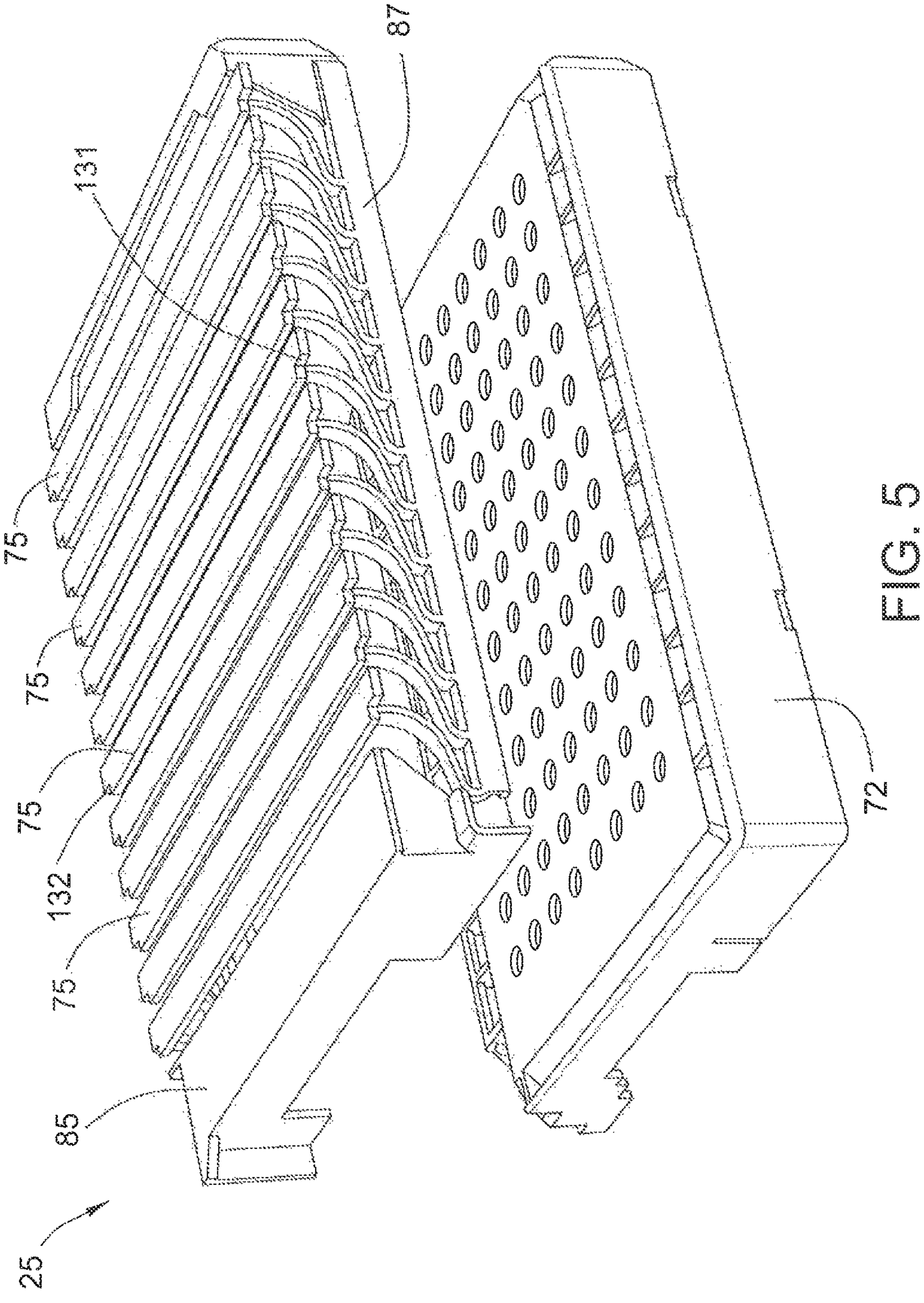
FIG. 5 is an exploded view of the cover of the multiwell assembly of FIG. 1.
Figure 6:
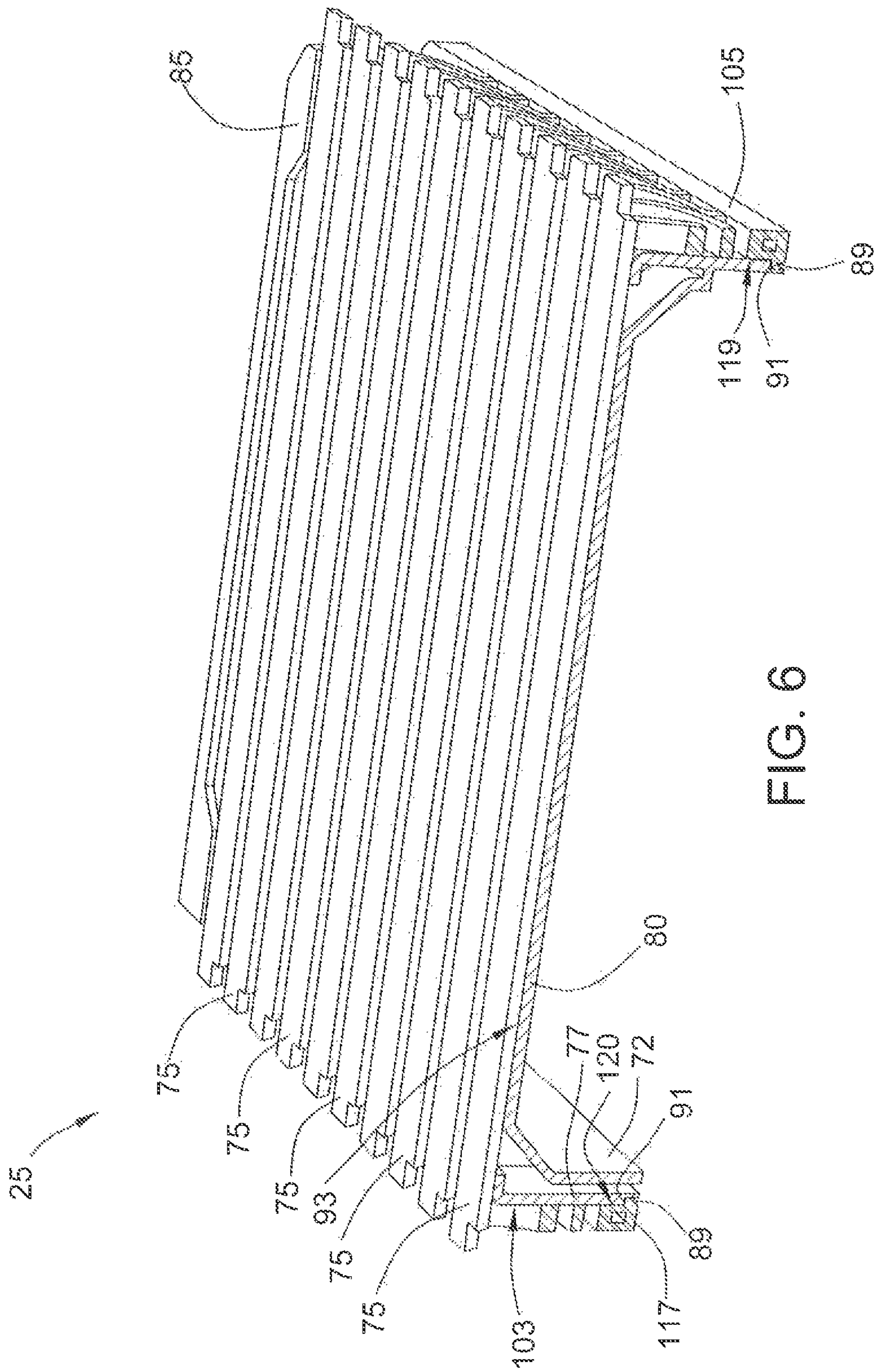
FIG. 6 is a perspective view, in transverse section, of the cover of FIG. 5.

Referring to FIGS. 5 and 6, the illustrated embodiment of the cover 25 has a two-part construction which includes the body 72 and a top part 85 comprising the shutters 75 and a shutter frame 87. The shutters 75 are pivotally mounted to the shutter frame 87. In other embodiments, the cover 25 can have an integral construction such that the shutters 75 and the body 72 are made from a single component. In still other embodiments, the cover 25 can have a different multi-piece construction. For example, in embodiments, each of the shutters 75 (or a subset of the shutters 75) can comprise its own piece (or assembly of parts) that are connected to the body 72.

Referring to FIGS. 5 and 6, the body 72 and the top part 85 both have a shape that is complementary to that of the microplate 22. In embodiments, the body 72 and the top part 85 are configured such that the top part 85 fits closely over the body 72. In embodiments, when the top part 85 is mounted to the body 72, the top part 85 and/or the body 72 can be flexed slightly to allow the parts 85, 72 to be assembled together.

In embodiments, the top part 85 and the body 72 can be assembled using any suitable technique. For example, in embodiments, the top part 85 can be secured to the body 72 using a suitable adhesive. In other embodiments, a suitable mechanical mounting arrangement can be used. In the illustrated embodiment, the top part 85 includes a plurality of connection members 89 in the form of hooks (see also, FIG. 9). The body 72 includes a corresponding number of recesses, which each includes an anchor surface 91 (see also, FIGS. 7 and 8) that is configured to retentively engage a corresponding hook 89 projecting from the top part 85. In this manner, the top part 85 is removably mounted to the body 72. In the illustrated embodiment, the hooks 89 and the anchor surfaces 91 are arranged with respect to each other such that the hooks 89 engage the anchor surfaces 91 in such a way as to allow the undersides of the shutters 75 to be in contacting relationship with an exterior surface 93 of the well cover portion 80 of the body 72 (see, e.g., FIG. 6).

Figure 7:
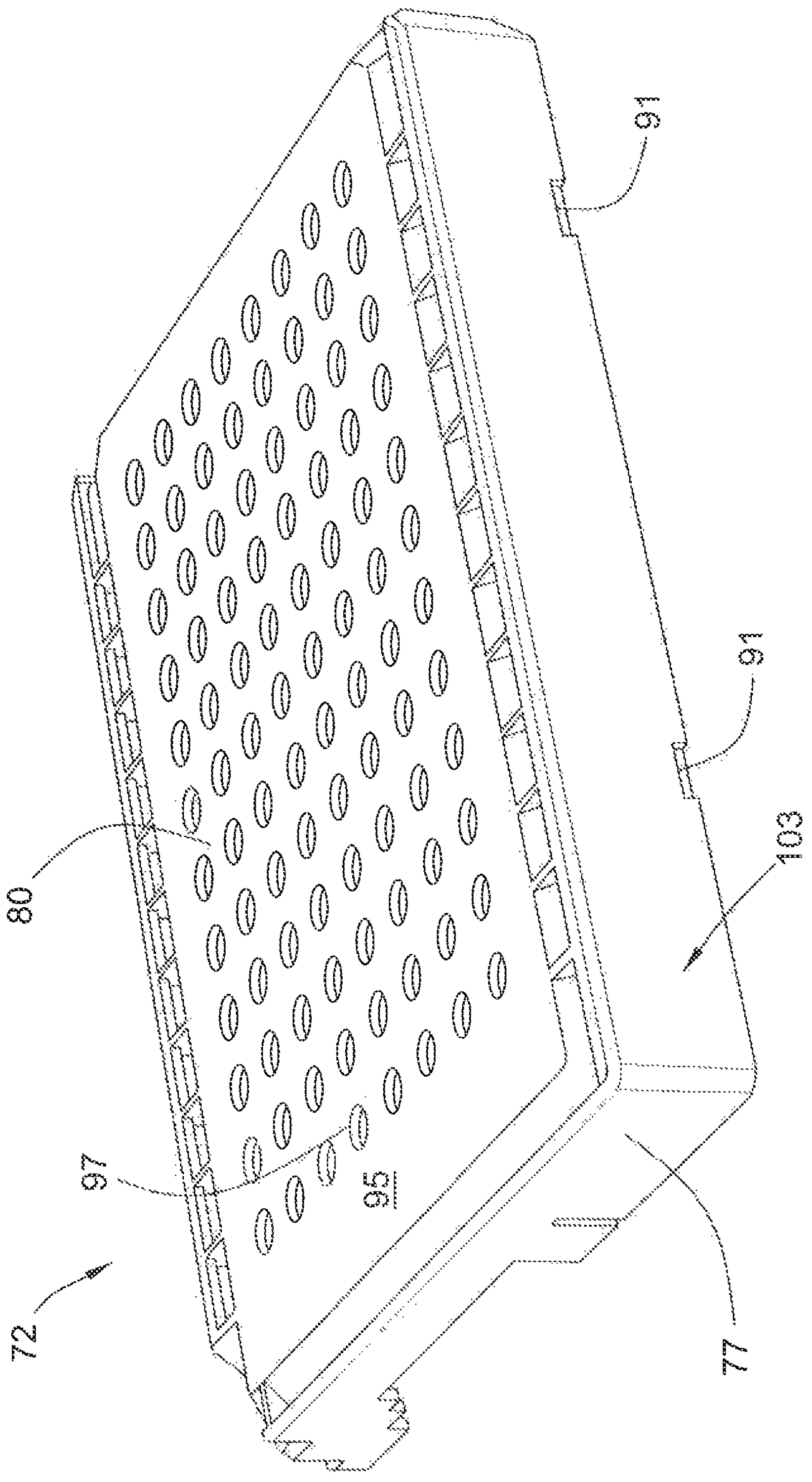
FIG. 7 is a top perspective view of a body of the cover of FIG. 5.

Referring to FIGS. 7 and 8, the body 72 of the cover 25 is adapted to be disposed over the microplate 22. The body 72 includes the well cover portion 80 and the shroud 77, which depends from the well cover portion 80. The well cover portion 80 includes a substantially planar well cover surface 95 that defines an array of bores 97. The bores 97 of the well cover surface 95 are respectively aligned with the openings 27 of the set of wells 27 of the microplate 22 when the multiwell assembly 20 is put together (see, e.g., FIG. 3). In embodiments, the cover 25 can include a well cover surface having a different number of bores to correspond to the number of well so the microplate with which it is intended to be used. The shroud 77 circumscribes the well cover portion 80, and together the shroud 77 and the well cover portion 80 define the interior cavity 70 within which the microplate 22 can be disposed (see FIG. 8). In embodiments, the size and shape of the cavity 70 can be configured to generally correspond to the profile of the microplate 22. In embodiments, the size of the shroud 77 can be varied to accommodate microplates with different heights.

Referring to FIG. 8, in embodiments, the body 72 of the cover 25 includes at least one connection member 82 adapted to removably mount the body 72 to the microplate holder 23. In the illustrated embodiment, the body 72 includes at least one connection member in the form of a hook 82 along each side and end thereof. The connection members 82 project from an interior surface 99 of the shroud 77 inwardly toward the internal cavity 70 of the body 72. The illustrated connection members 82 are disposed at a bottom edge 101 of the shroud portion 77.

In embodiments, the connection members 82 are adapted to removably mount the body 72 to the microplate holder 23 such that the cover 25 is in contacting relationship with the microplate 22 at only its top surface (see FIG. 2). In embodiments, the shroud portion 77 of the body 72 is in non-contacting relationship with the microplate 22 when the connection members 82 of the body 72 and the connection members 52 of the microplate holder 23 are interengaged. Such an arrangement can help avoid inadvertently bumping or moving the microplate when the cover is disengaged from the microplate holder 23, thereby helping to avoid inadvertent loss of fluid samples contained in the microplate 22 and/or jeopardizing the accuracy of measurement data taken from such fluid samples.

Referring to FIGS. 7 and 8, in the illustrated embodiment, an exterior surface 103 of the shroud portion 77 includes the anchor surface 91 for interengagement with the connection members 89 of the top part 85 (see also, FIG. 6). In the illustrated embodiment, each side of the body 72 includes a pair of anchor surfaces 91. In other embodiments, the anchor surfaces 91 can have a different arrangement.

Figure 9:
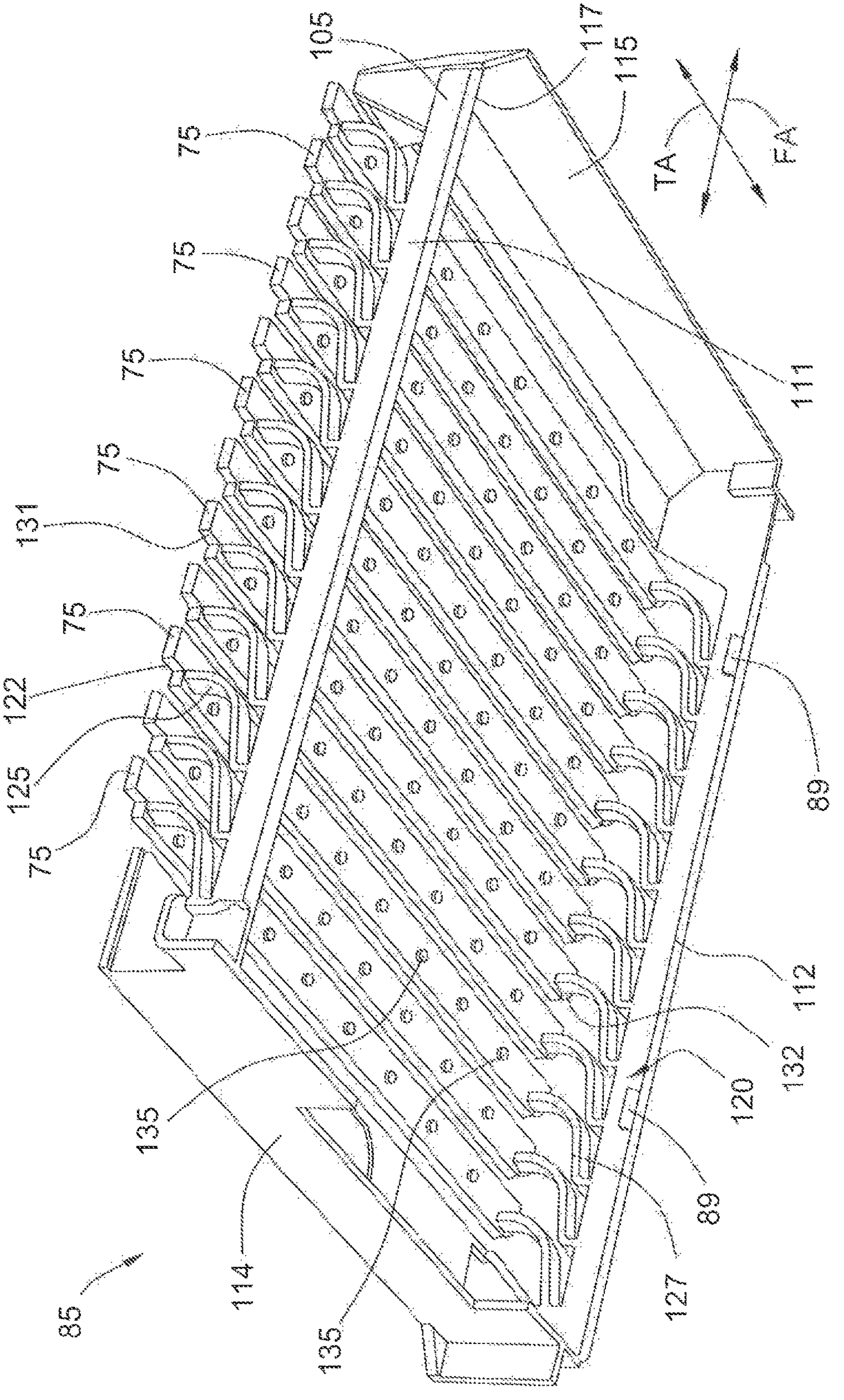
FIG. 9 is a bottom perspective view of a top part of the cover of FIG. 5 which includes a shutter frame and a plurality of shutters.

Referring to FIG. 9, in embodiments, the top part 85 has a shape and size configured such that the top part 85 fits closely over the body 72 of the cover 25. In embodiments, the top part 85 includes the plurality of shutters 75 and a shutter support frame 105 to which the shutters 75 are pivotally mounted. In embodiments, the shutter frame 105 is adapted to be mounted to the body 72, as is shown in FIG. 6, for example.

Referring to FIG. 9, the illustrated shutter frame 105 includes a pair of frame members 111, 112 and a pair of end portions 114, 115. The frame members 111, 112 each extend along a frame axis FA between the end portions 114, 115 and are disposed in lateral spaced relationship to each other along a transverse axis TA, which is perpendicular to the frame axis FA. In embodiments, the shutter frame 105 has an asymmetrical configuration, and the body 72 has a complementary configuration such that the shutter frame 105 is mountable to the body 72 in only a single orientation with respect to the body 72. In the illustrated embodiment, the end portions 114, 115 have different shapes and together with the frame members 111, 112 define a top part perimeter 117 that is complementary to the shroud portion 77 of the body 72 (see also, FIG. 6).

Referring to FIG. 9, in embodiments, the frame members 111, 112 are relatively rigid and are configured to serve as the foundation for the shutters 75. In the illustrated embodiment the frame members 111, 112 are in the form of elongate support beams. In other embodiments, the frame members 111, 112 can have a different configuration.

In the illustrated embodiment, each of the frame members 111, 112 includes a pair of connection members 89 in the form of hooks that are configured to retentively engage a respective one of the anchor surfaces 91 of the body 72 to assemble the top part 85 to the body 72 (see also, FIG. 6). The connection members 89 extend inwardly from an interior surface 119, 120 of each of the frame members 111, 112. In other embodiments, the arrangement of the connection members 89 can be varied.

In the illustrated embodiment, the shutters 75 are mounted to the body 72 via the shutter frame 105. The shutters 75 are movably attached to the shutter frame 105 such that the shutters 75 are each pivotally movable between the covered position (see FIG. 3) and the uncovered position (see FIG. 4). Referring to FIG. 9, in the illustrated embodiment, the shutters 75 are in spaced relationship to each other along the frame axis FA such that the shutters 75 are respectively aligned with the rows of bores in the body 72 when the top frame is mounted to the body 72 and such that the shutters 75 are respectively aligned with the rows of wells 27 of the microplate 22 when the cover 25 is disposed over the microplate 22. In embodiments, the shutters 75 can be in parallel relationship with respect to each other.

In the illustrated embodiment, the shutters 75 are substantially identically to each other. It will be understood that the description of one shutter 75 is applicable to the other shutters 75, as well. Each shutter 75 includes an occlusion member 122 and a pair of resiliently flexible arms 125, 127. The occlusion member 122 is connected to the shutter frame 105 via the support arms 125, 127. In embodiments, the shutter 75 includes the occlusion member 122 and at least one resiliently flexible arm 125, 127 to pivotally connect the occlusion member 122 to the support frame 105.

In the illustrated embodiment, the occlusion member 122 is in the form of an elongate planar bar that is configured such that the occlusion member 122 occludes the openings of a row of wells 27 of the microplate 22 when the shutter 75 is in the covered position. In embodiments, each end of the occlusion member 122 can have a notch 131, 132 therein which can be configured to help accept a push bar alongside of it to move an adjacent shutter from the covered position to the uncovered position (see also, FIG. 5).

Referring to FIG. 9, each occlusion member 122 includes a plurality of plug portions 135 in spaced relationship to each other along the transverse axis TA. Each plug portion 135 is configured to project into a respective one of the bores 97 of the well cover surface 85 of the body 72 when the shutter 75 is in the covered position (see, e.g., FIG. 3). The plug portions 135 can be provided to help promote a positive contacting relationship between the occlusion member 122 and the body 72 to help maintain the shutter 75 in the covered position, thereby helping to reduce evaporation of fluid samples contained in the wells 27 covered by the particular shutter 75. In other embodiments, the occlusion member 122 can have a different configuration.

Referring to FIG. 9, each occlusion member 122 is respectively connected to the shutter frame members 111, 112 via the associated pair of resiliently flexible arms 125, 127 such that the occlusion members 122 extend along the transverse axis TA and such that the occlusion members 122 occludes the respective openings of the row of wells 27 with which the particular occlusion member 122 is associated when the shutter 75 is in the covered position. In the illustrated embodiment, the resiliently flexible arms 125, 127 are adapted to bias the shutter 75 to the covered position.

In the illustrated embodiment, the support arms 125, 127 are substantially identical to each other. Accordingly, it should be understood that the description of one support arm is applicable to any of the other support arms as well. Referring to FIG. 3, one support arm 125 is shown. The support arms 127 at the other ends of the shutters 75 are constructed in a similar manner. A bottom end 140 of each arm 125 is connected to one of the support beams 111 of the support frame 105. A top end 143 of each arm 125 is connected to one end of the occlusion member 122. The support arm 125 includes a curved portion 145 that acts in the manner of a spring to urge the shutter 75 to the covered position. As such, in the illustrated embodiment, each shutter 75 is pivotally movable over a range of travel between the covered position (see FIG. 3) and the uncovered position (see FIG. 4).

Figure 4:
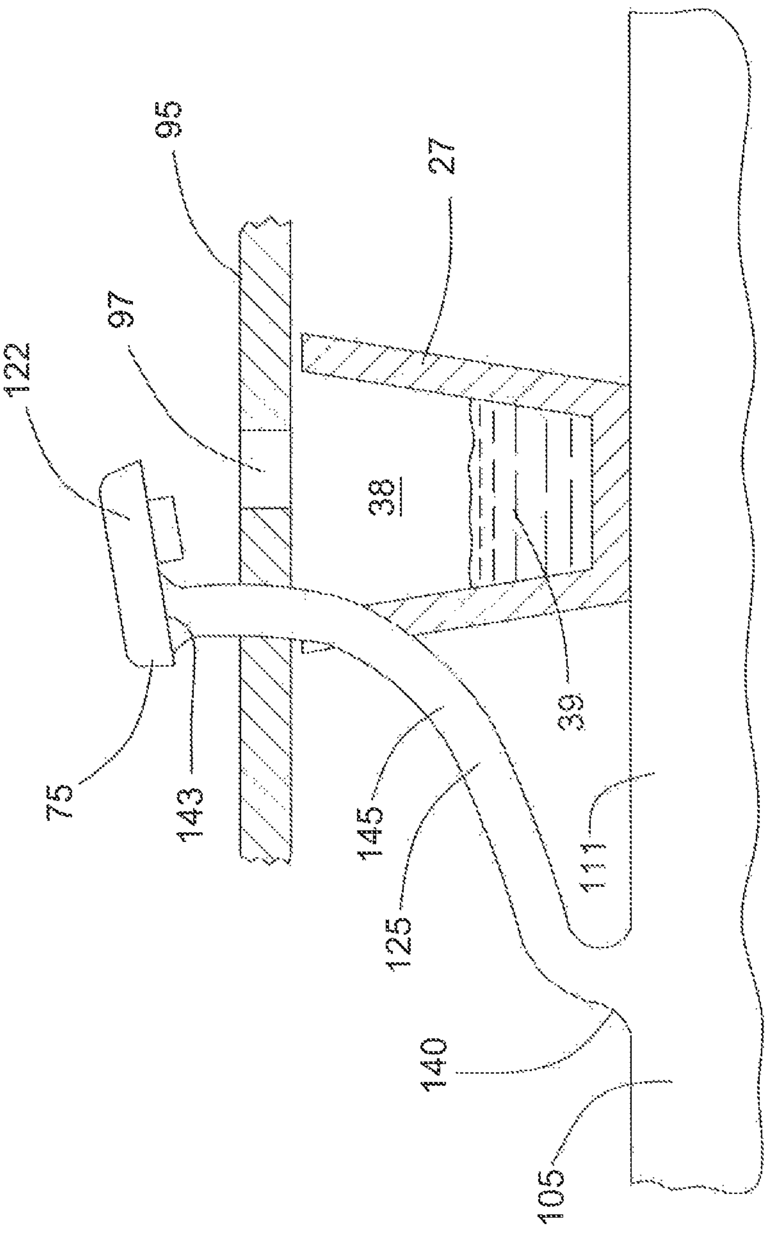
FIG. 4 is a view as in FIG. 3, but illustrating the shutter in an uncovered position with respect to the opening of the well.

Referring to FIG. 4, in embodiments, when the shutter 75 is moved to the uncovered position, the support arms 125, 127 of the shutter (one of which being shown) flexes in response to the movement of the occlusion member 122. When the displacing force that was applied to the shutter 75 to move it from the covered position to the uncovered position is removed, the support arms 125, 127 can act like springs to move the occlusion member 122 toward the well cover surface 95 to return the shutter 75 to the covered position such that the occlusion member 122 is in contacting relationship with the body 72, as shown in FIG. 3, with the plug portions 135 (one of which being shown) of the occlusion member 122 disposed in the respective bores 97 of the body 72. In embodiments, the support arms 125, 127 can have a variety of configurations that impart the ability of the shutter 75 to pivotally move between the covered position and the uncovered position in response to an exerted force.

Figure 10:
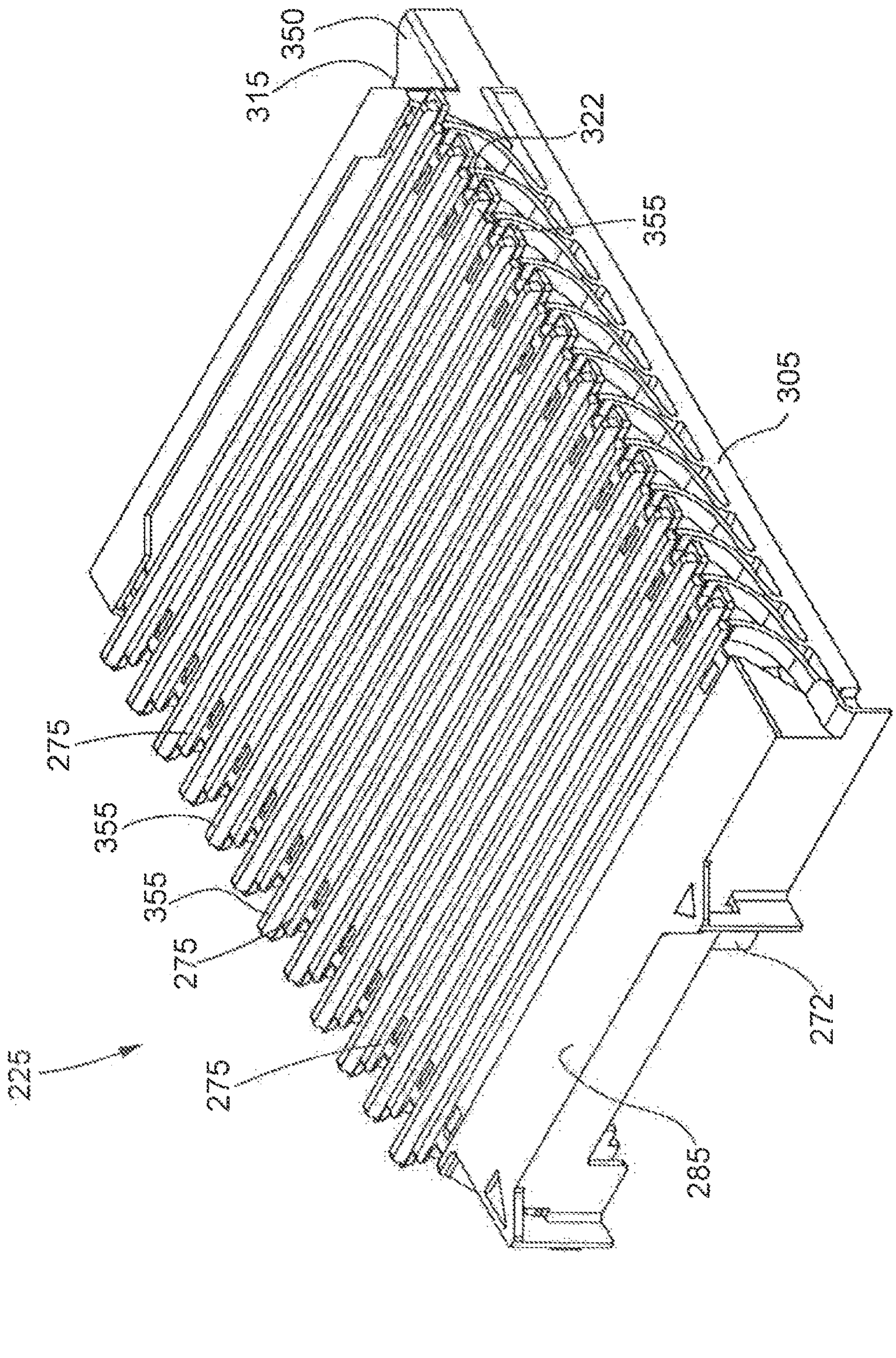
FIG. 10 is a perspective view of another embodiment of a cover constructed according to principles of the present disclosure suitable for use with embodiments of a multiwell assembly following principles of the present disclosure.
Figure 11:
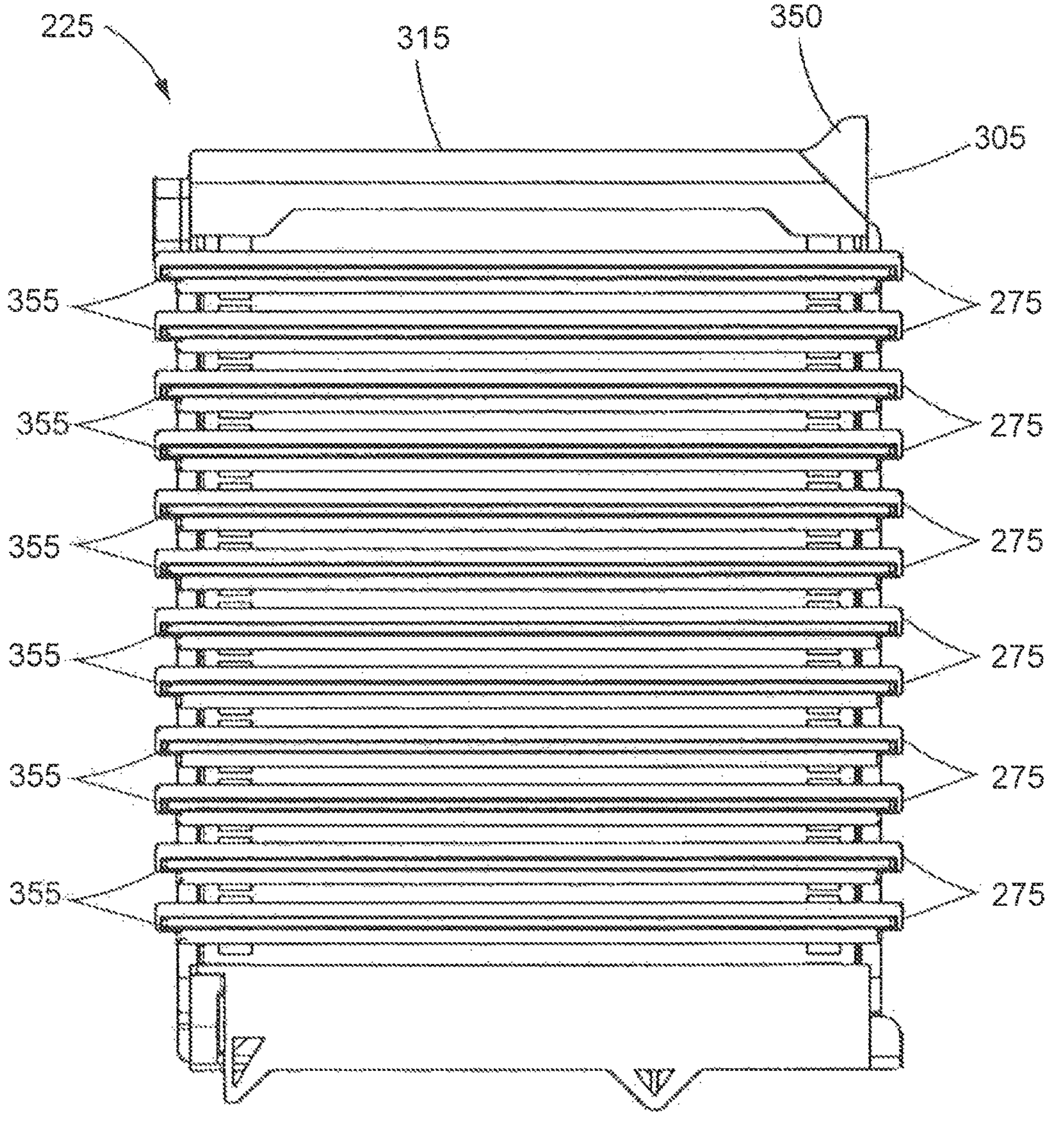
FIG. 11 is a top plan view of the cover of FIG. 10.
Figure 14:
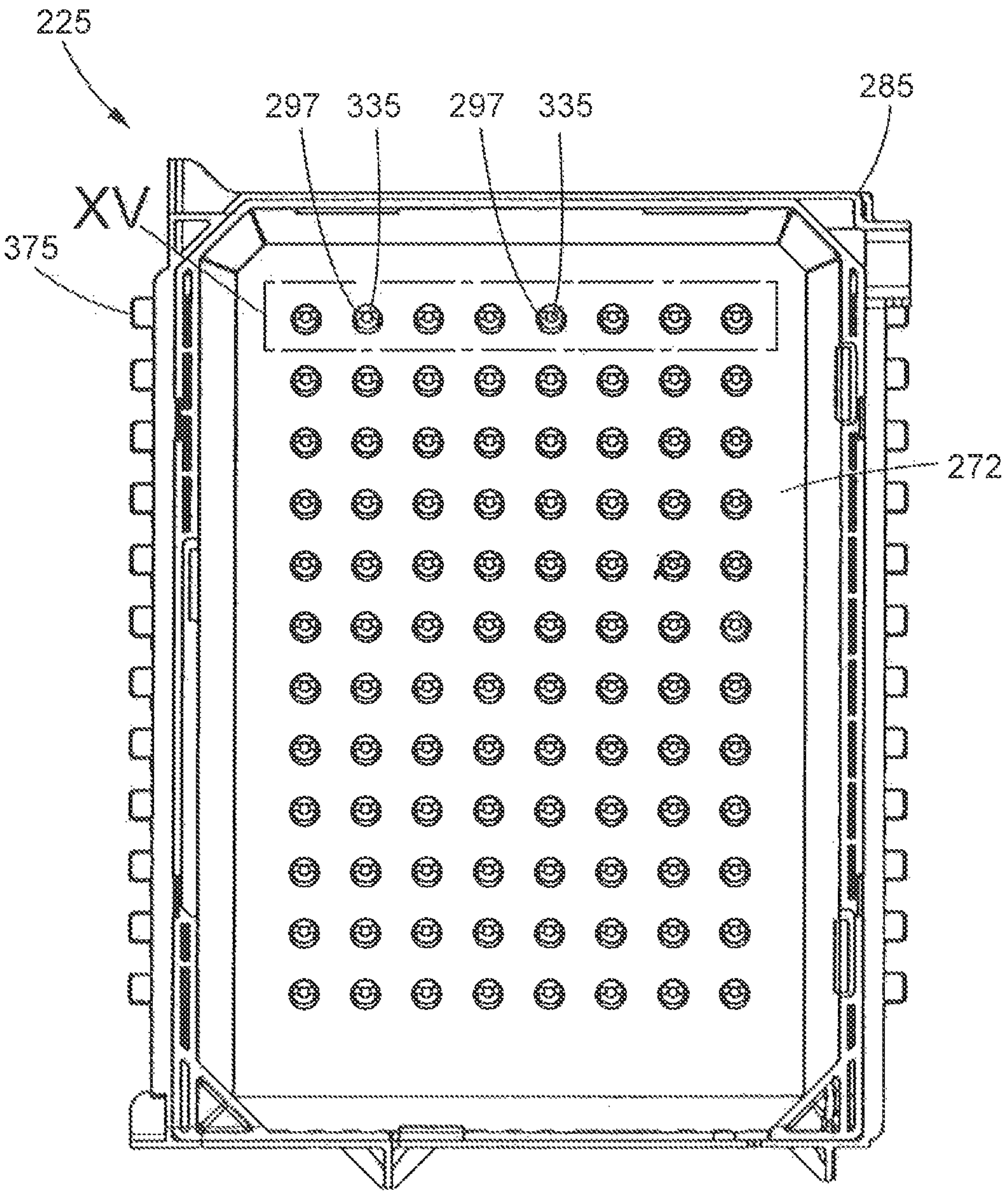
FIG. 14 is a bottom plan view of the cover of FIG. 10.

Referring to FIGS. 10-15, another embodiment of an evaporation cover 225 constructed according to principles of the present disclosure is shown. Referring to FIGS. 10 and 14, the cover 225 includes a top part 285 and a body 272.

Referring to FIGS. 10-13, the top part 285 includes a plurality of shutters 275 and a shutter frame 305. The shutters 275 are substantially identical to each other and are pivotally mounted to the shutter frame 305 such that each shutter 275 is independently movable over a range of travel between a covered position and an uncovered position as discussed above in connection with the cover 25 of FIGS. 1-9.

In embodiments, at least one part of the cover 225 can include an indicator element configured to interact with a suitable sensor adapted to detect the presence of the indicator element in a desired location. For example, referring to FIGS. 10 and 11, in the illustrated embodiment, the shutter frame 305 includes an indicator element 350 in the form of a protrusion extending from an end 315 of the shutter frame 305. The indicator element 350 can be configured such that when the cover 225 is mounted to a particular microplate holder 23, the indicator element 350 blocks an emitter from contacting a receiver such that a control logic element with which the receiver is tied can receive a signal from the receiver indicating that the cover 225 is in its place. In response to receiving such signal, the control logic element can initiate an automated testing sequence.

Referring to FIGS. 10-13, each shutter 275 includes a stiffening rib 355. The stiffening rib 355 is connected to the occlusion member 322. The shutters 275 are substantially identical to each other.

Figure 12:
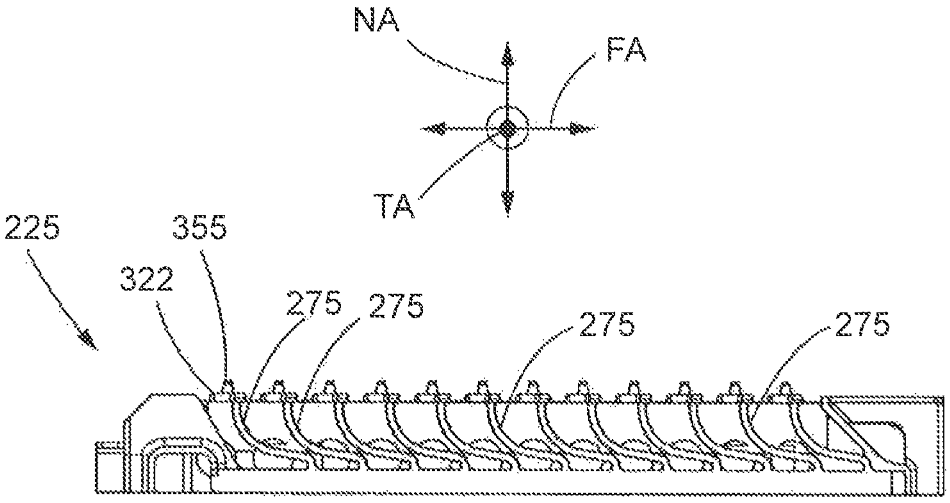
FIG. 12 is a left side elevational view of the cover of FIG. 10.
Figure 13:
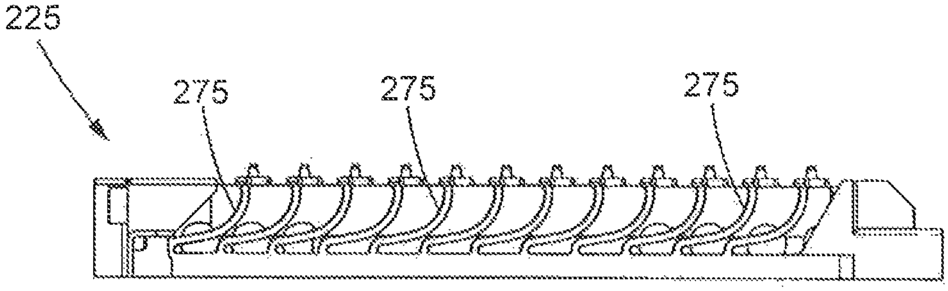
FIG. 13 is a right side elevational view of the cover of FIG. 10.

Referring to FIG. 12, in the illustrated embodiment, each stiffening rib 355 projects upwardly from its respective occlusion member 322 along a normal axis NA, which is perpendicular to both the frame axis FA and the transverse axis TA. The stiffening ribs 355 can be provided to help keep the respective occlusion member 322 to which it is connected substantially planar and to further promote a positive contact between the occlusion member 322 and the body 372 when the shutter is in the covered position.

Figure 15:
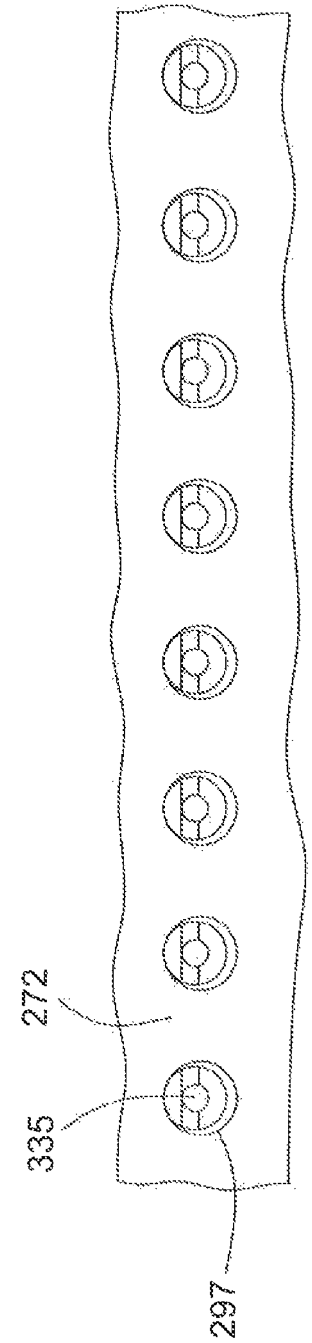
FIG. 15 is an enlarged, fragmentary view taken from FIG. 14 as indicated by rectangle XV, illustrating a plurality of plug portions of a shutter of the cover disposed within corresponding body openings defined in a body of the cover of FIG. 10.

Referring to FIGS. 14 and 15, each of the shutters 275 can include a plurality of plug portions 335 that are arranged to be disposed within the bores 297 defined by the body 272. The top part 285 and the body 272 of the cover 225 of FIGS. 10-15 can be similar in other respects to the top part 85 and the body 72, respectively, of the cover 25 of FIGS. 1-9.

In embodiments of a method of processing a fluid sample in a microplate following principles of the present disclosure, a cover constructed according to principles of the present disclosure is used to cover the microplate to help reduce the evaporation of fluid samples contained therein. In embodiments, a method of processing a fluid sample in a microplate following principles of the present disclosure can be used with any embodiment of a cover for the microplate according to principles discussed herein. A variety of methods for processing a fluid sample can be carried out according to embodiments of the invention, including a variety of assays.

Figure 16:
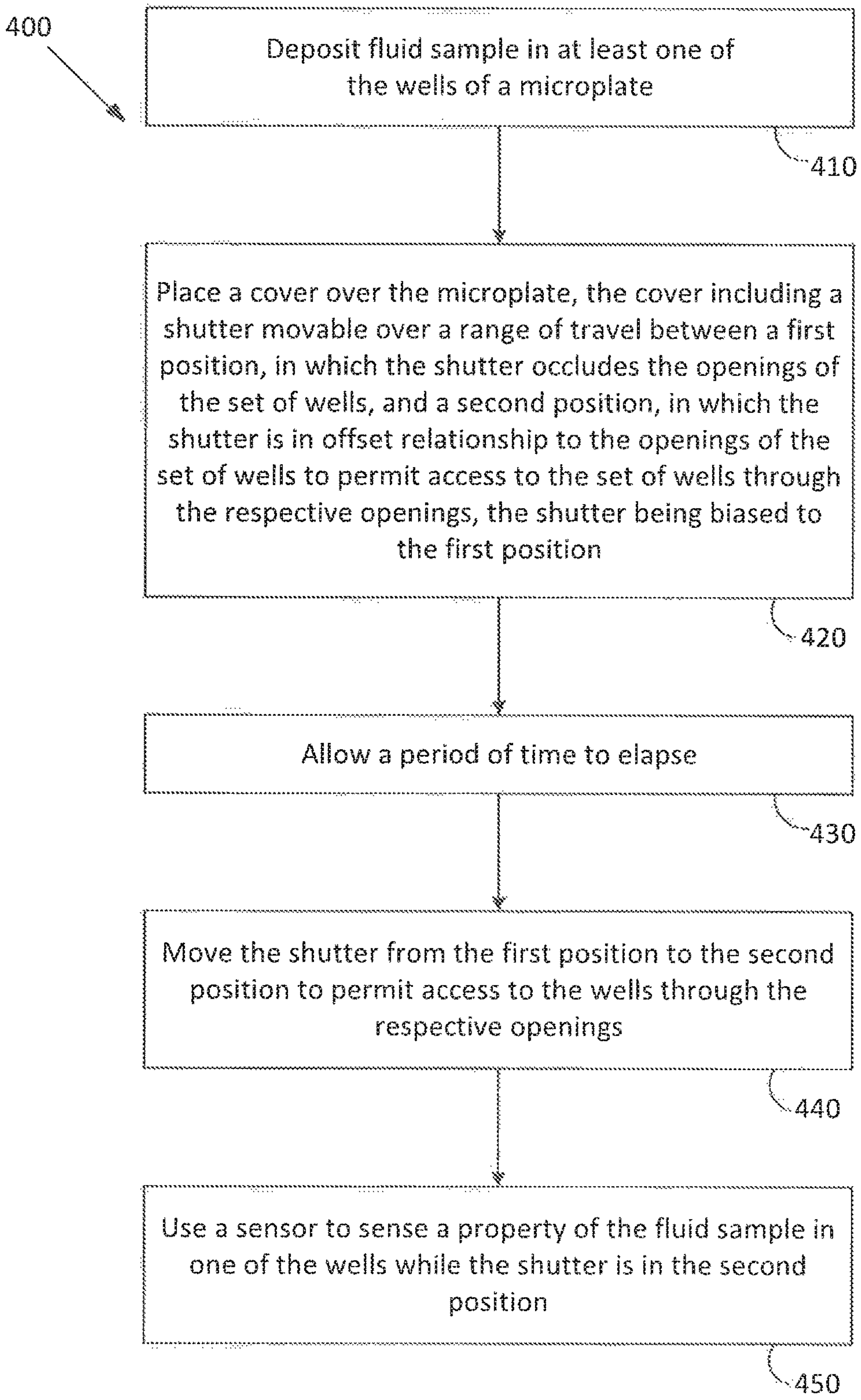
FIG. 16 is a flowchart illustrating an embodiment of a method of processing a fluid sample in a microplate following principles of the present disclosure.

Referring to FIG. 16, an embodiment of a method 400 of processing a fluid sample in a microplate following principles of the present disclosure are shown. The microplate includes a set of wells. Each well defines an opening. The illustrated method 400 of processing a fluid sample in a microplate includes depositing the fluid sample in at least one of the wells (410). A cover is placed over the microplate (420). The cover includes a shutter which is movable over a range of travel between a first position, in which the shutter occludes the openings of the set of wells, and a second position, in which the shutter is in offset relationship to the openings of the set of wells to permit access to the set of wells through the respective openings, the shutter being biased to the first position. A period of time is allowed to elapse (430). The shutter is moved from the first position to the second position to permit access to the wells through the respective openings (440). A sensor is used to sense a property of the fluid sample in one of the wells while the shutter is in the second position (450).

In embodiments, any suitable sensor, including conventional sensors, can be used. For example, in embodiments, sensors used in biolayer interferometry (BLI) for sensing a characteristic of the fluid sample can include, e.g., the sensing technology commercially-available from Pall Corporation (East Hills, N.Y.) under the "BLI" trade name.

In embodiments, moving the shutter comprises contactingly engaging the shutter by at least one push bar arranged with the sensor such that the push bar moves to engage the shutter and move the shutter to the second position and the sensor moves along with the push bar through the opening of the well with the fluid sample being sensed. In embodiments, the cover is placed over the microplate such that the cover is in contacting relationship with the microplate holder at only a top surface thereof.

In embodiments of a method of processing a fluid sample in a microplate following principles of the present disclosure, the method further includes disengaging the shutter such that the shutter moves from the second position back to the first position to occlude the openings of the set of wells.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multiwell assembly comprising:

a microplate, the microplate including a set of wells, each well defining an opening; and a cover, the cover including a body and a shutter, the body of the cover being disposed over the microplate, and the shutter being mounted to the body such that the shutter is movable over a range of travel between a first position, in which the shutter occludes the openings of the set of wells, and a second position, in which the shutter is in offset relationship to the openings of the set of wells to permit access to the set of wells through the respective openings.

2. The multiwell assembly according to claim 1, wherein the set of wells of the microplate comprises a first set of wells arranged in a row, and the microplate includes a second set of wells arranged in another row, and wherein the shutter of the cover comprises a first shutter, and the cover includes a second shutter, the second shutter being mounted to the body such that the second shutter is movable over a range of travel between a first position, in which the second shutter occludes the openings of the second set of wells, and a second position, in which the second shutter is in offset relationship to the openings of the second set of wells to permit access to the second set of wells through the respective openings, the first shutter and the second shutter each being independently movable between the first position and the second position.

3. The multiwell assembly according to claim 1, wherein the shutter is biased to the first position.

4. The multiwell assembly according to claim 1, wherein the cover includes a shutter frame, the shutter frame being mounted to the body, the shutter being movably attached to the shutter frame such that the shutter is mounted to the body via the shutter frame and such that the shutter is movable between the first position and the second position.

5. The multiwell assembly according to claim 4, wherein the shutter frame has an asymmetrical configuration and the body has a complementary configuration such that the shutter frame is mountable to the body in only a single orientation with respect to the body.

6. The multiwell assembly according to claim 4, wherein the shutter includes an occlusion member and at least one resiliently flexible arm, the occlusion member being connected to the shutter frame via said at least one resiliently flexible arm, the occlusion member being configured such that the occlusion member occludes the openings of the set of wells when the shutter is in the first position.

7. The multiwell assembly according to claim 6, wherein the shutter includes a stiffening rib, the stiffening rib connected to the occlusion member.

8. The multiwell assembly according to claim 6, wherein the body includes a well cover surface, the well cover surface defining an array of bores, the bores of the well cover surface being respectively aligned with the openings of the set of wells of the microplate, and wherein the occlusion member includes a plug portion projecting therefrom, the plug portion configured to project into one of the bores of the well cover surface when the shutter is in the first position.

9. The multiwell assembly according to claim 4, wherein the shutter frame includes a pair of frame members, the frame members each extending along a frame axis and being disposed in lateral spaced relationship to each other, and wherein the shutter includes an occlusion member and a pair of resiliently flexible arms, the occlusion member being respectively connected to the shutter frame members via the resiliently flexible arms such that the occlusion member extends along a transverse axis, the transverse axis being substantially perpendicular to the frame axis, and such that the occlusion member occludes the openings of the set of wells when the shutter is in the first position.

10. The multiwell assembly according to claim 9, wherein the resiliently flexible arms are adapted to bias the shutter to the first position.

11. The multiwell assembly according to claim 1, further comprising:

a microplate holder, the microplate holder adapted to support the microplate;

wherein the microplate includes a top surface, the top surface defining the openings of the set of wells; and wherein the body of the cover includes at least one connection member adapted to removably mount the body to the microplate holder such that the cover is in contacting relationship with the microplate at only the top surface thereof.

12. A cover for a microplate, the microplate including a set of wells, each well defining an opening, the cover comprising:

a body, the body being configured to be disposed over the microplate;

a shutter, the shutter being mounted to the body such that the shutter is movable over a range of travel between a first position and a second position, the shutter being adapted to occlude the openings of the set of wells when in the first position, and the shutter being adapted to be in offset relationship to the openings of the set of wells to permit access to the wells through the respective openings when in the second position.

13. The cover according to claim 12, wherein the set of wells of the microplate comprises a first set of wells arranged in a row, and the microplate includes a second set of wells arranged in another row, and wherein the shutter of the cover comprises a first shutter, the cover further comprising:

a second shutter, the second shutter being mounted to the body such that the second shutter is movable over a range of travel between a first position and a second position, the second shutter being adapted to occlude the openings of the second set of wells when in the first position, and the second shutter being adapted to be in offset relationship to the openings of the second set of wells to permit access to the second set of wells through the respective openings when in the second position;

wherein the first shutter and the second shutter are independently movable between the first position and the second position.

14. The cover according to claim 12, further comprising:

a shutter frame, the shutter frame being mounted to the body, the shutter being movably attached to the shutter frame such that the shutter is mounted to the body via the shutter frame and such that the shutter is movable between the first position and the second position.

15. The cover according to claim 14, wherein the shutter frame includes a pair of frame members, the frame members each extending along a frame axis and being disposed in lateral spaced relationship to each other, and wherein the shutter includes an occlusion member and a pair of resiliently flexible arms, the occlusion member being respectively connected to the shutter frame members via the resiliently flexible arms such that the occlusion member extends along a transverse axis, the transverse axis being substantially perpendicular to the frame axis, and such that the occlusion member occludes the openings of the set of wells when the shutter is in the first position.

16. The cover according to claim 15, wherein the body includes a well cover surface, the well cover surface defining an array of bores, and wherein the occlusion member includes a plug portion projecting therefrom, the plug portion configured to project into one of the bores of the well cover surface when the shutter is in the first position.

17. A method of processing a fluid sample in a microplate, the microplate including a set of wells, each well defining an opening, the method comprising:

depositing the fluid sample in at least one of the wells;

placing a cover over the microplate, the cover including a shutter, the shutter being movable over a range of travel between a first position, in which the shutter occludes the openings of the set of wells, and a second position, in which the shutter is in offset relationship to the openings of the set of wells to permit access to the set of wells through the respective openings, the shutter being biased to the first position;

allowing a period of time to elapse;

moving the shutter from the first position to the second position to permit access to the wells through the respective openings;

using a sensor to sense a property of the fluid sample in one of the wells while the shutter is in the second position.

18. The method according to claim 17, wherein moving the shutter comprises contactingly engaging the shutter by at least one push bar arranged with the sensor such that the push bar moves to engage the shutter and move the shutter to the second position and the sensor moves along with the push bar through the opening of the well with the fluid sample being sensed.

19. The method according to claim 17, wherein the cover is placed over the microplate such that the cover is in contacting relationship with the microplate holder at only a top surface thereof.

20. The method according to claim 17, further comprising:

disengaging the shutter such that the shutter moves from the second position back to the first position to occlude the openings of the set of wells.

* * * * *